US010693951B2

(12) United States Patent
Jujjuri et al.

(10) Patent No.: US 10,693,951 B2
(45) Date of Patent: Jun. 23, 2020

(54) DECENTRALIZED, RESOURCE AWARE LOAD DISTRIBUTION IN A DISTRIBUTED SYSTEM

(71) Applicant: salesforce.com, inc., San Francisco, CA (US)

(72) Inventors: Venkateswararao Jujjuri, Beaverton, OR (US); Andrey Yegorov, San Francisco, CA (US); Rithin Shetty, Sunnyvale, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 116 days.

(21) Appl. No.: 15/610,964

(22) Filed: Jun. 1, 2017

(65) Prior Publication Data
US 2018/0352023 A1    Dec. 6, 2018

(51) Int. Cl.
*H04L 29/08*     (2006.01)
*G06F 9/50*      (2006.01)
*H04L 12/26*     (2006.01)
*G06F 11/00*     (2006.01)

(52) U.S. Cl.
CPC ........ *H04L 67/1008* (2013.01); *G06F 9/5083* (2013.01); *G06F 11/00* (2013.01); *H04L 43/0817* (2013.01); *H04L 67/1029* (2013.01); *H04L 67/289* (2013.01)

(58) Field of Classification Search
CPC .................................................. H04L 67/1008
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |

(Continued)

*Primary Examiner* — Tonia L Dollinger
*Assistant Examiner* — Jonathan A Sparks
(74) *Attorney, Agent, or Firm* — Schwabe Williamson & Wyatt

(57) ABSTRACT

Distributed Systems are becoming very large and are being served by 10s of 1000s of individual machines. Among heterogeneous nodes, one node's capabilities can vary widely from that of others in the same cluster, for example, in a cluster of storage servers. Each of the clients/writers may retrieve, periodically, from all the servers, important metrics such as free disk space capacity, average disk IO utilization over the last N minutes, etc. We call these client to nodes (servers) messages as "periodic metrics query." Using received metrics, clients dynamically assign weights to each of the servers as an indication of their current capabilities. Server metrics and or weights are distributed across the clients, and each client may make independent placement decisions based on their view of the cluster. Because clients are using substantially the same information for making decisions on placement, the result is improved balance across the servers.

19 Claims, 9 Drawing Sheets

(56) References Cited

U.S. PATENT DOCUMENTS

| | | | |
|---|---|---|---|
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| 6,351,775 B1 * | 2/2002 | Yu | H04L 67/1008 370/237 |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,554,929 B1 * | 10/2013 | Szeto | H04L 67/1002 709/229 |
| 8,566,301 B2 | 10/2013 | Rueben et al. | |
| 8,646,103 B2 | 2/2014 | Jakobson et al. | |
| 8,832,234 B1 * | 9/2014 | Brooker | G06F 17/30194 709/219 |
| 9,626,262 B1 * | 4/2017 | Vogel | G06F 11/2033 |
| 9,807,016 B1 * | 10/2017 | Sarangapani | H04L 47/125 |
| 2001/0044791 A1 | 11/2001 | Richter et al. | |
| 2002/0038360 A1 * | 3/2002 | Andrews | H04L 29/12066 709/223 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0066759 A1 * | 4/2004 | Molteni | H04L 41/048 370/329 |
| 2004/0128001 A1 | 7/2004 | Levin et al. | |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0055435 A1* | 3/2005 | Gbadegesin ............ H04L 29/06 709/224 |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0109873 A1* | 5/2012 | Xiong ................ G06Q 10/0633 706/52 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0310418 A1* | 10/2014 | Sorenson, III ...... H04L 67/1038 709/226 |
| 2014/0359537 A1 | 12/2014 | Jackobson et al. |
| 2017/0264493 A1* | 9/2017 | Cencini ................ H04L 41/044 |
| 2018/0349363 A1 | 12/2018 | Jujjuri et al. |

* cited by examiner

DECENTRALIZED, RESOURCE AWARE LOAD DISTRIBUTION IN A DISTRIBUTED SYSTEM

RELATED CASE

None.

COPYRIGHT NOTICE

Copyright 2017 salesforce.com, inc. A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to processing and storage load distribution in a distributed computing system.

BACKGROUND

Distributed systems are becoming very large and are being served by tens thousands of individual machines. It is extremely unpractical to have homogeneous machines making up this clustered distributed system. In the world of heterogeneous nodes, one node's capabilities can widely vary with that of others in the same cluster either static hardware configurations or dynamic load on the system. Hardware configurations can vary on storage capacity, Storage efficiency, performance, network bandwidth, network performance, number of CPU cores, CPU capabilities, clock rate, amount of memory that are constant for a given machine. Most common implementations tend to distribute work and data across the cluster nodes in a randomized fashion. Treating all nodes equally and uniform distribution can lead to some nodes getting overwhelmed because they have limited disk capacity or have limited CPU/Memory resource or currently it is serving high workload. Improvements are needed in decentralized, resource aware load distribution in a distributed system.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A. B and C."

As noted above, passwords and the like are sorely lacking in security and convenience to limit access to a host system, for example, a database system or application service provider and the like. In this disclosure, we describe some examples and embodiments that enable secure remote user authentication leveraging public key cryptography and key splitting. These designs obviate the need for a user to remember complex passwords, while improving security.

I. Example System Overview

Figure 1A:
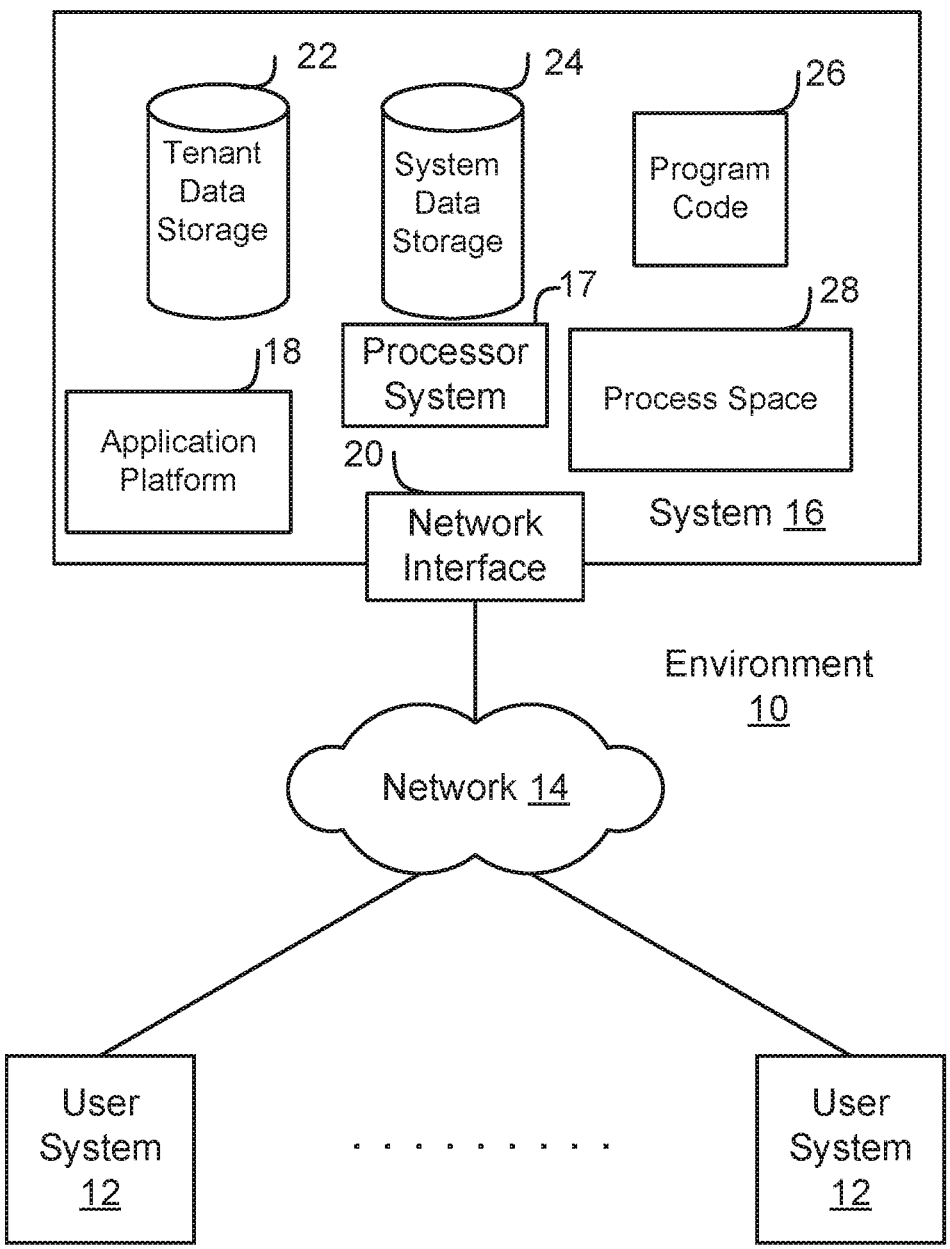
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
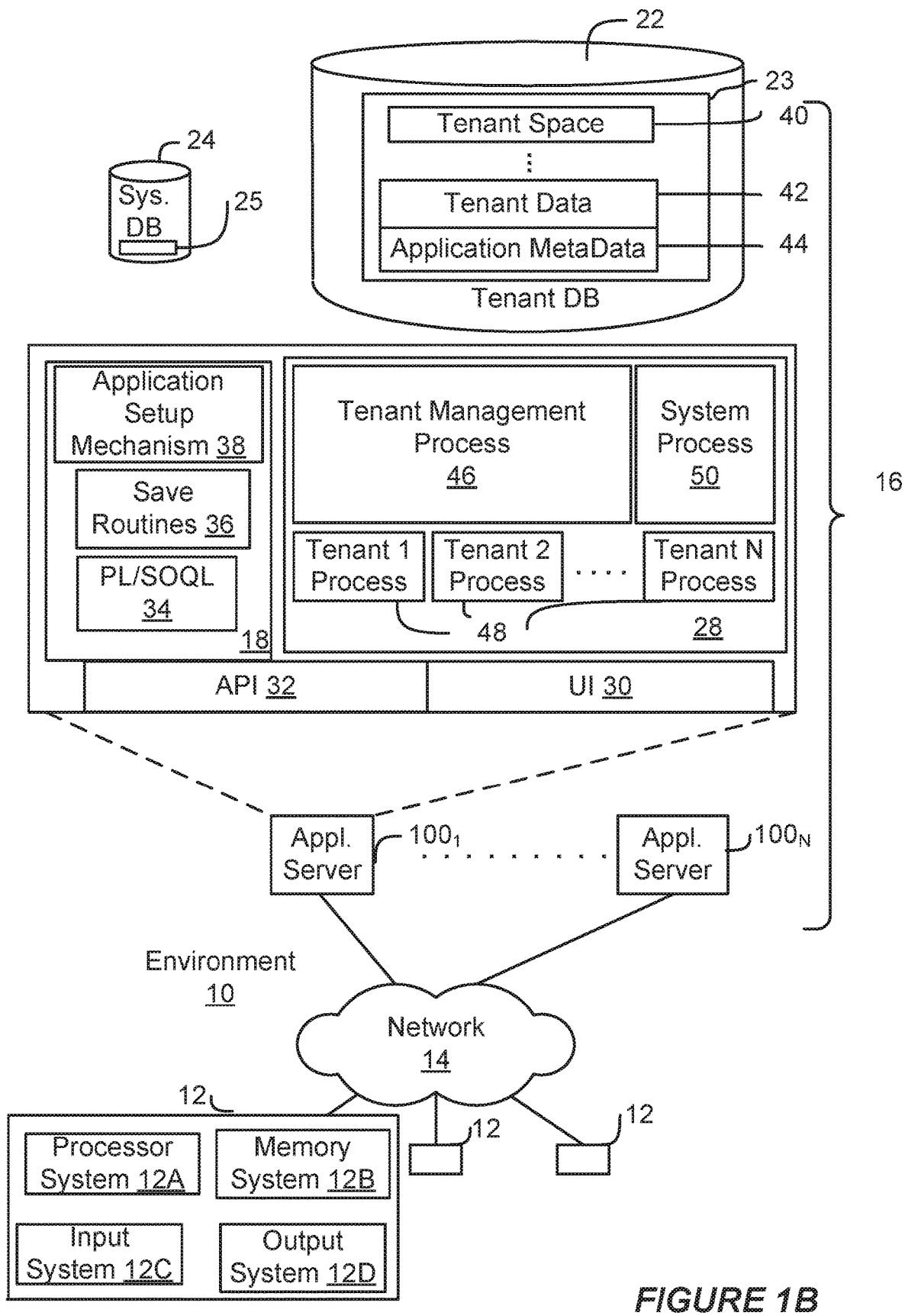
FIG. 1B shows a block diagram of example implementations of elements of FIG. 1A and example interconnections among these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server 100 can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer % while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
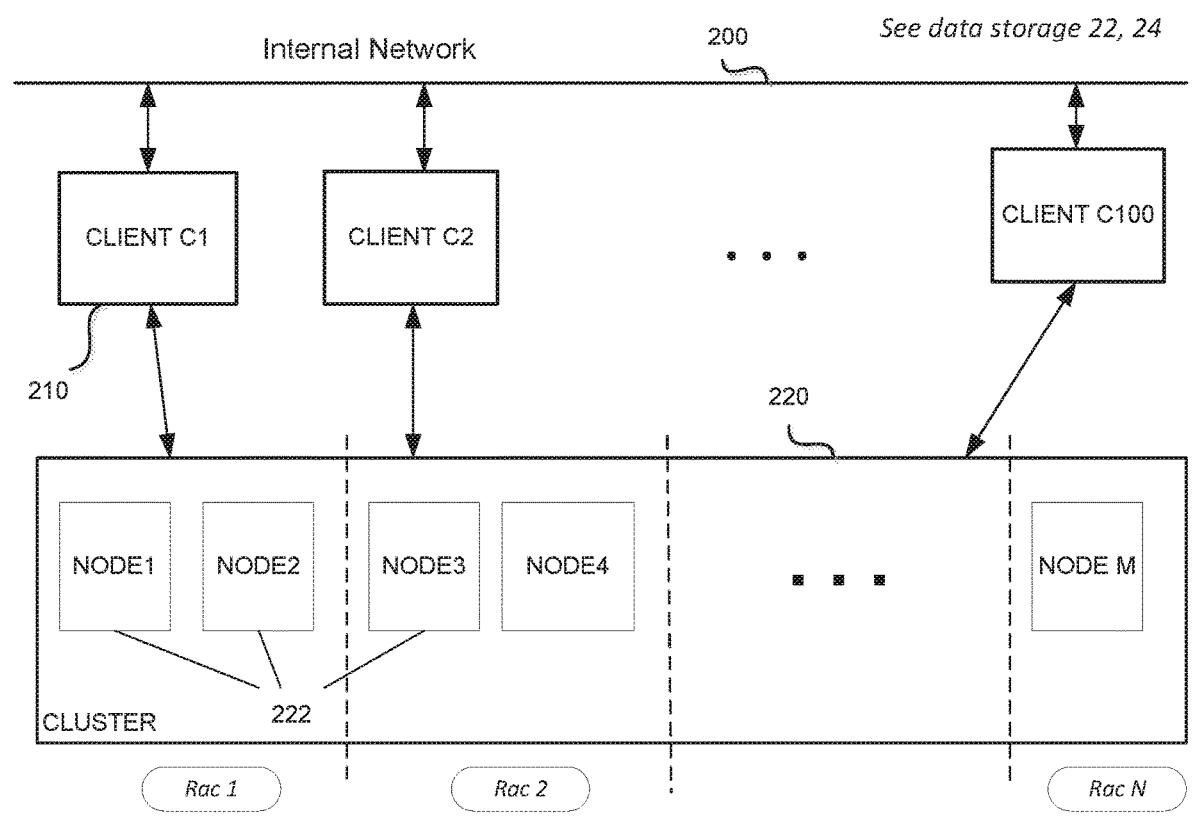
FIG. 2 shows a simplified block diagram of a cluster of servers in a distributed data storage system.

FIG. 2 shows a simplified block diagram of a cluster 220 of servers (Nodes 1-M) in a distributed data storage system. In some embodiments, a data storage system may correspond to data storage elements 22, 24 described above. For illustration, an internal network 200 is provisioned to support communications, including but not limited to messaging and data transfer, among clients 210, numbered C1-C100. These numbers of clients and servers are not critical or limiting; they are merely illustrative. In this figure, the clients are "internal" to a system, such as system 16 in FIG. 1A; they are not clients associated with external user systems 12.

A client in general may be defined as a piece of computer hardware and/or software that accesses a service made available by a server. Clients 210 may be coupled to an internal network 200, i.e., a system network that is not exposed to external clients. A server is often (but not always) on another computer system, in which case the client may access the service by way of a network. In FIG. 2, networking between the clients and the cluster nodes is omitted for simplicity. Nonetheless, each of the clients 210 has access to the data storage cluster 220. More specifically, each client is able to communicate (for example, exchange messages, data packets, etc.) In practice, there may be thousands of nodes in a single cluster, and there may be many clusters in a system. In some embodiments, a cluster may be partitioned in "racs" (Rac 1, Rac 2, etc.) RAC stands for Real Application Clusters, a version of Oracle database. In some embodiments, a cluster may include replica nodes, where stored data is duplicated, for high reliability or availability. The number of nodes (and clusters) is likely to vary dynamically, as resources are added (brought online) or conversely, resources may be retired or fail.

In a typical heterogeneous system, the individual nodes, which may be servers, have various capabilities. Hardware configurations can vary on storage capacity, storage efficiency, performance, network bandwidth, network performance, number of CPU cores, CPU capabilities, clock rate, amount of memory. Even where servers have similar static capabilities, their current status or loading may vary considerably. For example, when new servers are added to the cluster, they may have large storage capacity available, as they have not yet received write messages. Other existing servers may be nearly full, so immediately there is an imbalance in the cluster. However, simply sending all new writes to the new server(s) may be imprudent, as they be limited by CPU loading, network traffic or other factors. Thus, dynamic variations can be based on current CPU load on the machine, amount of free memory on the system, percentage of network saturation, etc. So it is extremely inefficient to consider all these machines in the same way while distributing work across this cluster.

Figure 3A:
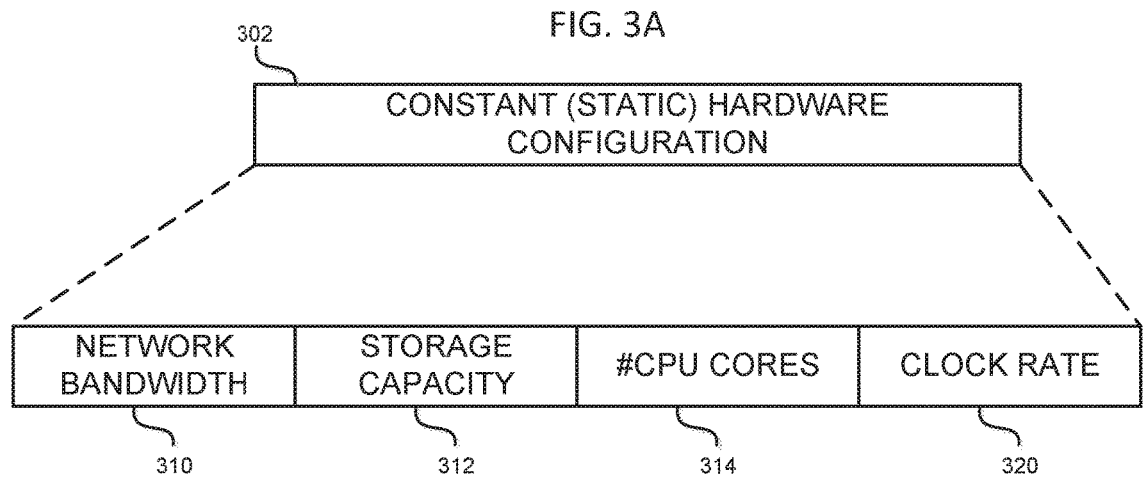
FIG. 3A illustrates some examples of static server node metrics that may be used in realizing some embodiments consistent with the present disclosure.

Regarding FIG. 3A, as described in more detail below, it illustrates some examples of static server node metrics that may be used in realizing some embodiments consistent with the present disclosure. One aspect of the present disclosure calls for collecting metrics about the server nodes in a given cluster. Metrics may collected by each of the clients. Metrics data may be stored in local memory, DRAM, flash, or any other memory means accessible to the client. In some embodiments, this data may comprise a static configuration record 302 for each server node. The record 302 may include the following fields, for example, the server node network bandwidth 310, storage capacity 312, number of CPU cores 314, clock rate 320, and other metrics. These are static characteristics of a hardware configuration; they generally do not change in the context of the present disclosure.

Figure 3B:
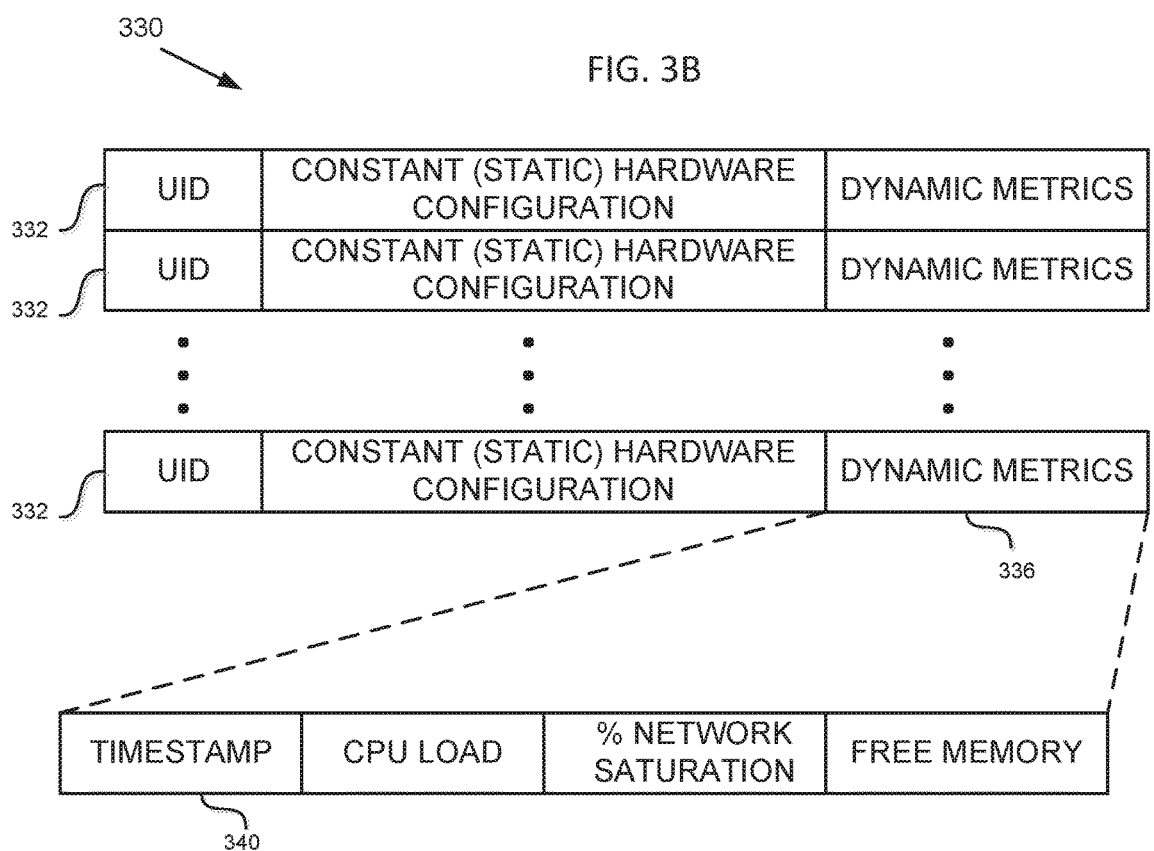
FIG. 3B illustrates some examples of dynamic server node metrics that may be used in realizing some embodiments consistent with the present disclosure.

Referring now to FIG. 3B, it illustrates some examples of dynamic server node metrics that may be used in realizing some embodiments consistent with the present disclosure. A table 330 may have a record 332 for some, or preferably all, of the nodes in the cluster. Each record 332 may have an identifier field "UID" for the corresponding node. The record may include (or link or associate to) the static hardware configuration of the node. The hardware configuration may be similar to the illustration in FIG. 3A. In addition, the record may include (or link or associate to) dynamic metrics for the corresponding node, field 336. This field may include, for example, various dynamic metrics such as CPU load, percentage network saturation, and free memory. Other metrics may be used as well. A timestamp 340 indicates the time at which the dynamic metrics were collected. The timestamp may be provided by the reporting server node, or added by the client, although the former may be more accurate.

Figure 4A:
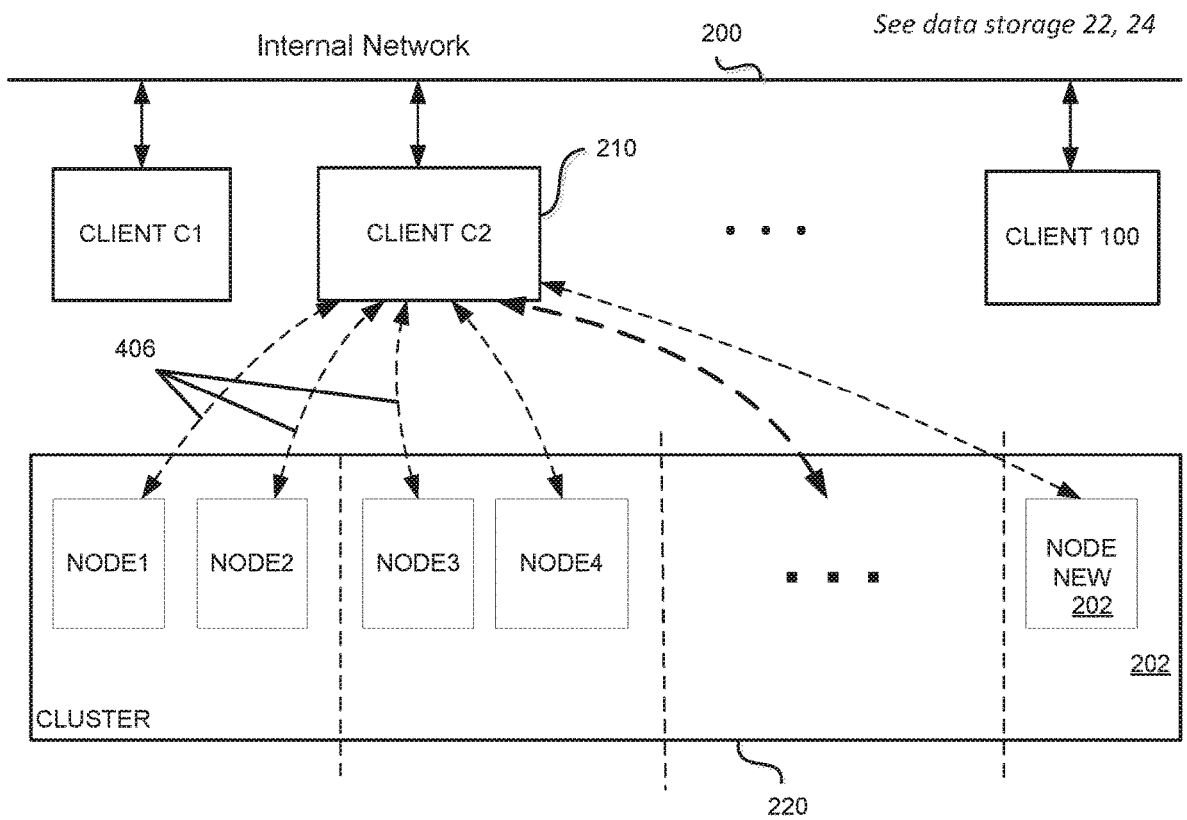
FIG. 4A is a simplified conceptual diagram illustrating a client entity retrieving node metrics from each of the server nodes in a cluster.

FIG. 4A is a simplified conceptual diagram illustrating a client entity 210 collecting metrics data 406 from each of the server nodes in a cluster 220. In an embodiment, a query message essentially asks the server node to which it is directed to reply to the inquiring client with current (dynamic) metrics about the server. These metrics may include some of those mentioned above. The specific details and protocols for these exchanges may vary with different applications and are a matter of design choice. Dynamic node metric data collection by the clients can be implemented in various ways. Some examples are described below, including a scheduled or periodic approach, an event driven approach, an opportunistic approach, was well as any combination of these features. In some embodiments, each of the clients may collect metrics from each of the server nodes. In other embodiments, node metrics may be delivered in other ways, for example, via a centralized system, pushed externally via a $3^{rd}$ service, gossip-style, etc. However the node metrics data is provided, these features enable each client to make autonomous decisions for allocating loading or access requests (for example, memory write requests) among the server nodes. In this way, the allocation decisions are distributed rather than centralized and each client is "aware" of current conditions at various nodes in the cluster.

Figure 4B:
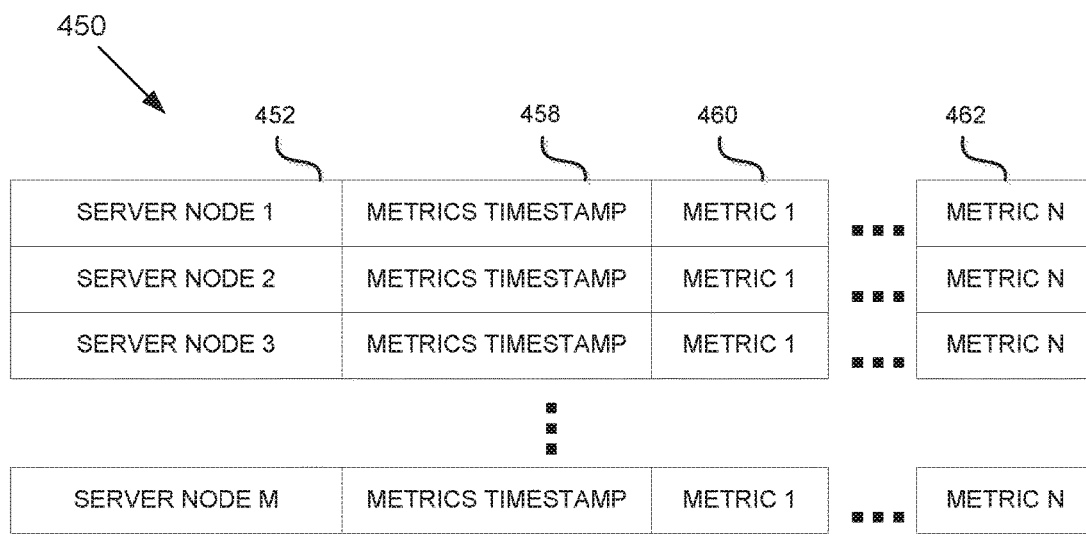
FIG. 4B is a simplified conceptual diagram illustrating a table storing server node metrics collected by a client in a distributed data storage system.

FIG. 4B illustrates a data table 450 storing server metrics. The structure and arrangement of the table are not critical. Indeed, some embodiments may not utilize a table structure to store this data at all. In this example, table 450 includes a record or row for each server node, identified at 452 as SERVER NODE 1-SERVER NODE M. Each record may include a metrics timestamp 458, and one or more dynamic node metrics, illustrated as Metric 1 (460) . . . Metric N (462). The metrics may include those described with regard to FIG. 3B. During operation, the timestamp and metrics for a given server node will be updated repeatedly to reflect the most current data reported.

Figure 5A:
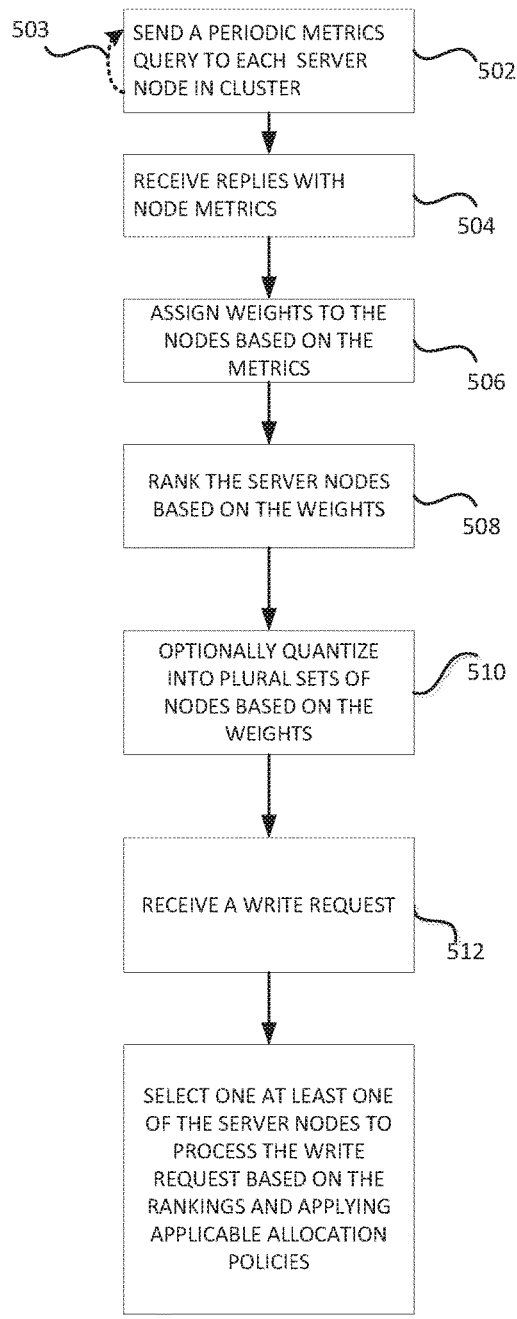
FIG. 5A is a simplified flow diagram of an example client process for resource aware load distribution in a distributed system.

FIG. 5A is a simplified flow diagram of an example client process for resource aware load distribution in a distributed system of the type described. At block 502, a client sends a periodic metrics query message to each server node in the cluster. The loop 503 is to illustrate that the process 502 may be repeated periodically. The frequency (period) preferably is tunable. Higher frequency of periodic metrics queries will provide more accurate (up to date) information about each node's metrics. However, one of the drawbacks of retrieving these metrics on a very high frequency, for example, every minute or every 5 minutes, is that in larger clusters with 1000s of storage servers and clients, there may be millions of such query packets every few minutes. In some embodiments, this volume may impact system performance. Below we describe some processes to mitigate the volume of queries. The client receives replies from the server nodes containing the corresponding node metrics, block 504.

Based on the acquired node metrics (which may be stored as discussed above), the client assigns a value or weight to each node, block 506. For example, nodes with higher free disk space and lower IO utilization are given higher weights than those with lower free disk space or the ones with high free disk space but high IO utilization. In another example, nodes with better network bandwidth capabilities may be assigned more write requests than similarly capable nodes with lower network bandwidth. Similar decisions can be taken while directing a read request to one of the replica nodes. These processes lead to more balanced placement of data within the cluster and also leads to more effective usage of the resources.

In general, various metrics may be used, or combined with others, to generate the weights to be assigned. Preferably, the weights are generated programmatically for speed, using predetermined algorithms. For example, linear equations may be used to combine various metrics, utilizing various coefficients or parameters to control the influence of each metric. These parameters may be tunable; and they may be developed or "learned" experimentally.

Piggyback

Figure 5B:
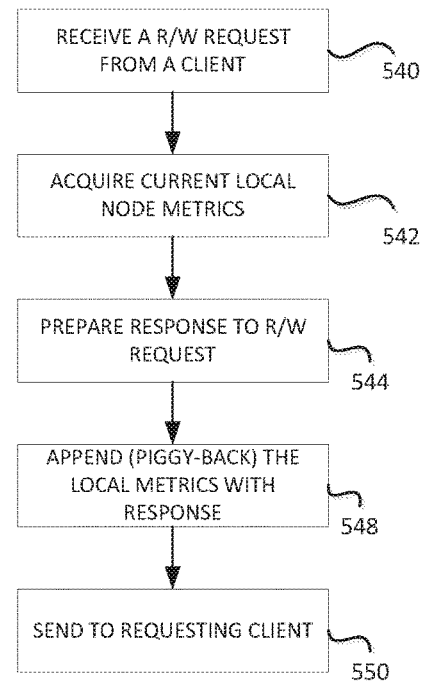
FIG. 5B is a simplified flow diagram of an example server node process to piggyback local metrics in a response to a request.
Figures 6A, 6B:
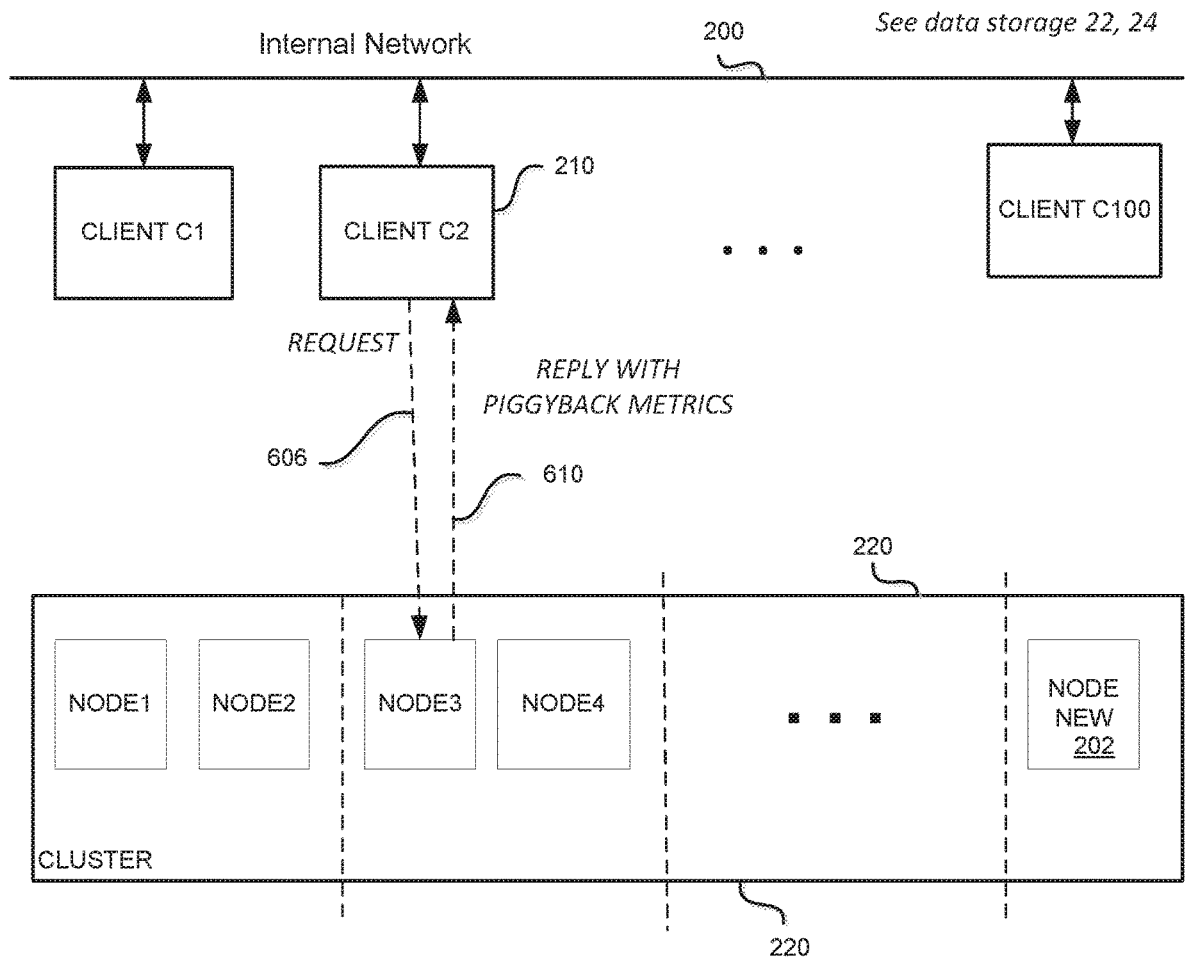
FIG. 6A is a simplified conceptual diagram illustrating request and reply messaging between a client and a server node.
FIG. 6B is a simplified conceptual diagram illustrating a read reply packet with appended (piggyback) server node metrics.

There are several ways of collecting the metrics in addition to (or combined with) explicitly querying each of the servers periodically ("periodic metrics query") as described above. One alternative we call "piggybacking," as follows. In some embodiments, the storage servers send their metrics to clients piggy-backed on (appended to) responses to regular read/write requests. This reduces the number of explicit requests to be sent; those explicit requests (the periodic metrics query) may be sent to only those servers with which the client isn't actively communicating, or had not communicated recently. FIG. 5B is a simplified flow diagram of an example server node process to piggyback local metrics in a response to a R/W request. A server receives a R/W request from a client, block 540. The server node assembles current local node metrics, block 542. Generally these would by dynamic metrics as discussed above. The server node prepares a response to the R/W request, in the usual known fashion (a "regular response"), block 544. Further, the server appends or "piggybacks" the local metrics on to the regular response, block 548. Then the response, including the node metrics, is returned to the requesting client, block 550. In this way, periodic metric queries need not be sent, or they may be deferred, to nodes where R/W requests and replies recently occurred. In some cases, a node may be programmed to piggyback metrics on every reply it sends. In other embodiments, a node may append piggyback metrics only when requested to do so in the R/W request message. FIG. 6A is a simplified conceptual diagram illustrating request and reply messaging between a client and a server node. Here, a client 210 (C2) sends a request message 606, and the server (Node 3 for illustration) sends a reply 610 with metrics as described. FIG. 6B is a simplified conceptual diagram illustrating a read reply packet 610 with appended (piggyback) server node metrics.

Figure 7:
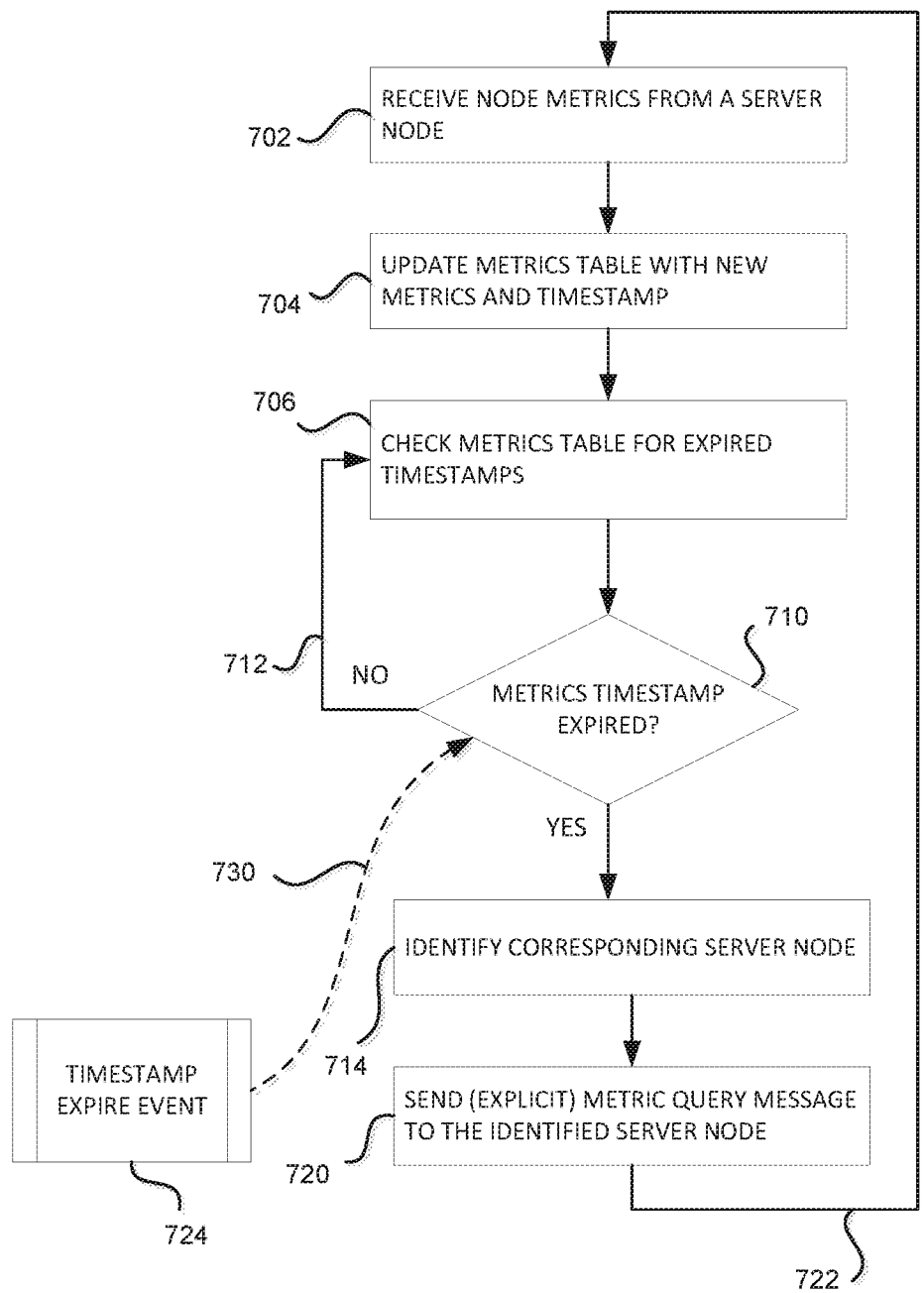
FIG. 7 is a simplified flow diagram of an example client process for maintaining current server node metrics to improve resource aware load distribution in a distributed system.

In some embodiments, the client "expires" metrics that have a timestamp that is deemed too old. For example, the timestamp may reflect an age that exceeds a default or nominal frequency of the periodic metrics query. The expiration may trigger an asynchronous explicit metrics query. FIG. 7 is a simplified flow diagram of an example client process for maintaining current server node metrics to improve resource aware load distribution in a distributed system. Here, a client may receive node metrics from a server node, block 702. The client may update a server metrics table with the new metrics data and updated timestamp, block 704. In some embodiments, the table may be similar to the illustration of FIG. 4B.

The client may check the metrics table for expired timestamps, for example, those older than a predetermined age, block 706. If none are found, the process may loop via path 712. If an expired timestamp is found, decision 710, the client process identifies the corresponding server node (for example, using the identifier in the table), block 714. Then, the client may send an explicit metric query message to the identified node, block 720, in order to update the server metrics. In another (asynchronous) embodiment, an expired timestamp may trigger an event message to the client, event 724. The client may then execute the steps 714 and 720 as discussed.

Allocating Requests to Server Nodes

Figure 5C:
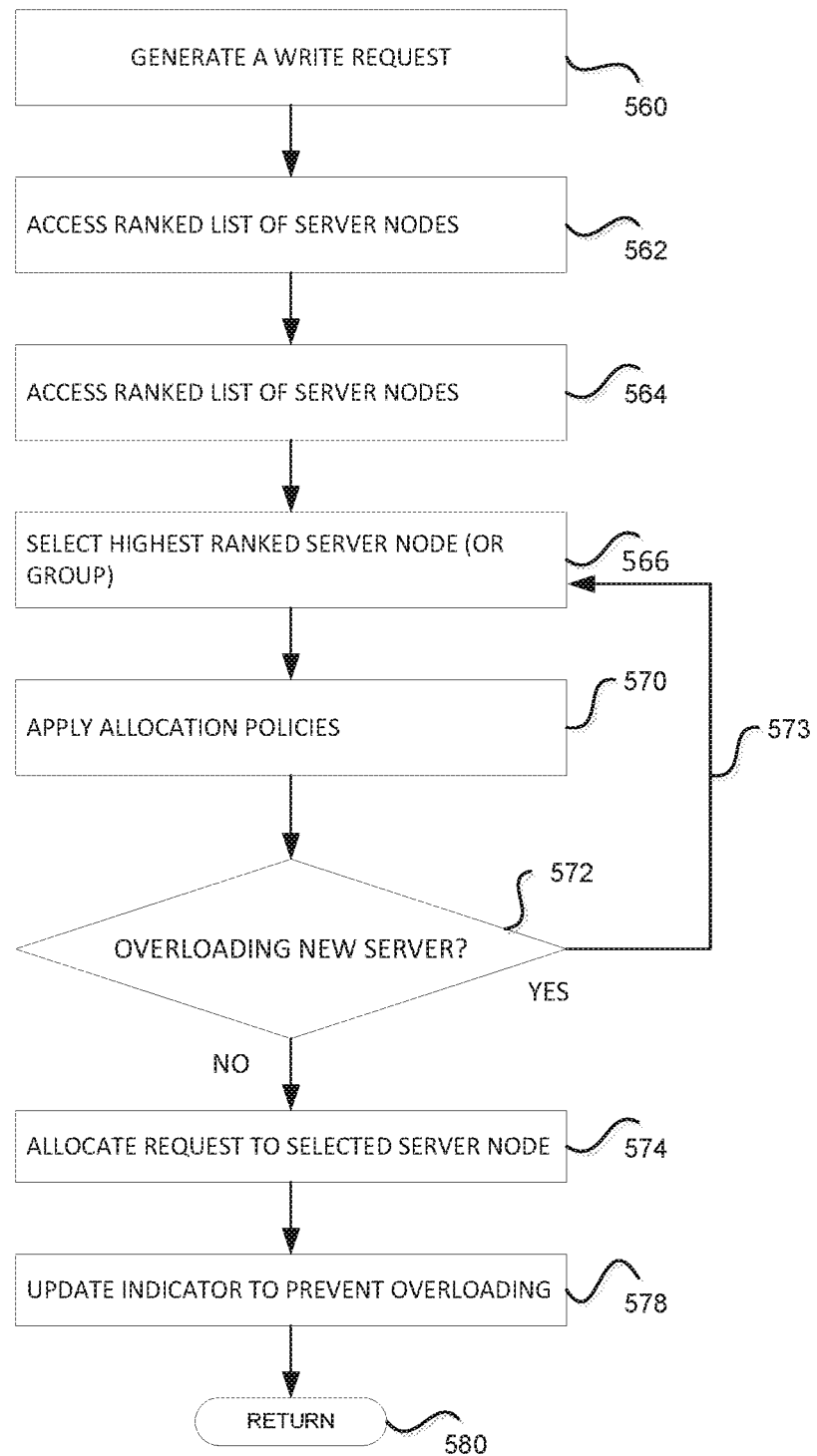
FIG. 5C is a simplified flow diagram of an example process for a client to allocate a request to a server node in a distributed data storage system.

FIG. 5C is a simplified flow diagram of an example process for a client to allocate a request to a server node in a distributed data storage system, in accordance with some embodiments. Here, a client generates a write request, block 560. The client accesses its own ranked list of server nodes, block 562. The list may be ranked according to the weights described above. Recall, the weights, and thus the ranking, is updated dynamically based on server metrics. The client selects a highest ranked server node, block 566. Next the client may apply one or more allocation policies to the pending write request, block 570.

In some embodiments, the weights may be divided into groups. For example, a highest weight group may be assigned probabilities, for example, 0.9 to 1.0. A second group may be assigned probabilities 0.8 to 0.9, and so on. Then, a write request may be allocated to the highest level group. Within that group presumably there are many server nodes. An individual server node within the group may be selected by various means, for example, randomly.

In some embodiments, depending on the type of use case, the allocation policies may include one or more of the following:

A. Free disk space aware: If the cluster takes mostly write only traffic, we can distribute the load such that the nodes with higher free disk space get more writes than the ones with lower free disk space.

B. CPU load based distribution: If the load being distributed within the cluster is CPU bound, the distribution should take into account such metrics as the average CPU utilization over the last 60 seconds and distribute load more to nodes with lower average CPU utilization.

C. Network bandwidth based distribution: If the nodes in the cluster are more or less identical in most respects but have different network bandwidth capabilities or they are located in data centers with different ingress/egress network bandwidth, in such cases the distribution could be based on network bandwidth as a weight.

D. Combination: If the workload is mixed with a comparable mix of read and write traffic, the weights could be derived using a combination of some of the above: free disk space, avg. IO utilization, avg. CPU utilization, etc.

E. Rack-aware. If the allocation policy is rack-aware, it should be taken into account while selecting a server for placement of load. For example, two nodes from the same rack may have the two largest weights in the cluster. Preferably, the policy would ensure selection of nodes from different racks even where the second node selected doesn't have the second highest weight.

These and other policies may be realized by applying them to determine or adjust the individual node weights, based in part on some or all of the other node metrics, as illustrated above. Another policy relates to sending requests to a new server, i.e., one that recently came on-line in a cluster. A new server would have a large amount of free storage space, which would tend to increase its weight. However, if many clients send requests to the same new server, it may quickly become overloaded, for example, in terms of bandwidth. Decision 572 checks for this situation. For example, the client may count a number of write requests sent to a new server, at least for an initial period of time. If the server is being overloaded, the process may loop back via 573 to select a different server. If the selected server is not overloaded, the process continues to allocate the request to the selected server node, block 574. A counter may be updated when the request is allocated to an identified new server, block 578, to prevent overloading. Finally, the process concludes at 580.

Hot Potato

Despite the distributed set of clients trying their best to place the data as well as they could, we could end up with some nodes becoming overloaded. In such cases, the overloaded server/node receiving such requests can explicitly reject such requests with an error message saying it is overloaded. The clients can then resend such requests to other relatively lightly loaded nodes/servers. The client can then update the metrics for the overloaded server such that its weight reduces. This feature makes the clusters very dynamic and would start responding to changes very quickly by shifting the load from overloaded systems to nodes with lighter loads.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. In a distributed computing system including a cluster of server nodes and a plurality of clients coupled to the cluster of server nodes, a method comprising:
    at one or more of the clients, receiving server node metrics associated with individual server nodes in the cluster;
    at one or more of the clients, assigning weights to at least some of the server nodes based on the associated metrics;
    at one or more of the clients, ranking the server nodes based on the weights assigned to the server nodes;
    at one of the clients, generating a request message;
    at the one client, selecting one of the server nodes in the cluster based at least in part on the rankings of the server nodes;
    at the one client, allocating the request message to the selected server node;
    at one of the clients, piggybacking a metrics query message onto a read or write request message to send to a server node;
    at one of the clients, receiving a read/write (R/W) reply message from a first server node from the cluster of server nodes;
    extracting piggybacked server metrics from the R/W reply message; and
    updating the weight assigned to the first server node based on the extracted server metrics.

2. The method of claim 1 wherein the server node metrics include at least one of free disk space capacity, average disk TO utilization over a last M minutes, and average network TO utilization over a last N minutes.

3. The method of claim 1 including applying a predetermined allocation policy to ranking the server nodes.

4. The method of claim 3 wherein the allocation policy provides that nodes with higher free disk space and lower TO utilization are given higher weights than those with lower free disk space or the ones with high free disk space but high TO utilization.

5. The method of claim 3 wherein the allocation policy provides that nodes with relatively greater network bandwidth capabilities are given more write requests than nodes with lower network bandwidth.

6. The method of claim 1 including:
    periodically sending the metrics query messages to the server nodes;
    receiving updated metrics from at least some of the server nodes responsive to the metrics query messages; and
    updating the respective weights assigned to the server nodes responsive to the updated metrics.

7. The method of claim 1 including, for each respective client, storing the most recently received server metrics in a table accessible to the respective client.

8. The method of claim 1 including:
    storing the received server metrics along with an associated timestamp for each set of metrics;
    identifying a server for which the received server metrics have expired, based on the associated timestamp; and
    updating the stored server metrics associated with the identified server.

9. The method of claim 1 including:
    assigning each of the server nodes to a group of nodes, wherein each group of nodes corresponds to a predetermined range of probabilities.

10. The method of claim 1 including applying a placement policy that includes, in a case that the cluster receives write traffic exceeding a predetermined threshold frequency, distributing the load of write requests based at least in part on free disk space reported in the server node metrics.

11. The method of claim 1 including applying a placement policy that includes, in a case that a load being distributed within the cluster is disk bound, distributing the load based at least in part on free disk space reported in the server node metrics.

12. The method of claim 1 wherein applying a placement policy that includes, in a case that the server node metrics in the cluster are substantially similar but have different network bandwidth capabilities or they are located in data centers with different ingress/outgress network bandwidth, modifying the assigned weights based at least in part on network bandwidth as reported in the server node metrics.

13. The method of claim 1 including:
    counting requests to a new server node, and limiting a number of the counted requests to the new server node based on a predetermined parameter.

14. A system comprising:
    a distributed cluster of server nodes; and
    a plurality of clients each having access to the cluster of server nodes, wherein the clients are configured to:
        receive server node metrics associated with the server nodes;
        assign weights to the server nodes based on the metrics;
        rank the server nodes based on the weights assigned to the server nodes;
        select one of the server nodes in the cluster based at least in part on the assigned weights;
        generate a request message;
        allocate the request message to the selected server node;
        receive a reply message from a first server node from the cluster of server nodes;
        extract piggyback server node metrics from the reply message; and
        update the assigned weight of the first server node based on the piggyback server node metrics.

15. The system of claim 14 wherein the clients are further configured to—
    apply an allocation policy, wherein the application policy provides that nodes with higher free disk space and lower IO utilization, as reported in the server node metrics, are given higher weights than those with lower free disk space or the ones with high free disk space but high IO utilization.

16. The system of claim 14 wherein the clients are further configured to—
    apply an allocation policy, wherein the application policy provides that nodes with relatively higher network bandwidth capabilities are given more write requests than nodes with relatively lower network bandwidth.

17. The system of claim 14 wherein the clients are further configured to—
    apply an allocation policy, wherein the application policy provides that nodes with relatively higher network bandwidth capabilities are given more read requests than nodes with relatively lower network bandwidth.

18. The method of claim 1, further comprising:
    at one of the clients, receiving a rejection of a metrics query from a server node indicating an overloaded condition; and
    responsive to the rejection, lowering a weight assigned to the server node from which the rejection was received.

19. The system of claim 14, wherein the clients are further configured to:
- receive a rejection of a metrics query from a server node indicating an overloaded condition; and
- responsive to the rejection, lowering a weight assigned to the server node from which the rejection was received.

* * * * *